(12) United States Patent
Manadhata et al.

(10) Patent No.: US 8,370,613 B1
(45) Date of Patent: Feb. 5, 2013

(54) METHOD AND APPARATUS FOR AUTOMATICALLY OPTIMIZING A STARTUP SEQUENCE TO IMPROVE SYSTEM BOOT TIME

(75) Inventors: Pratyusa Manadhata, Marina Del Rey, CA (US); Tzi-cker Chiueh, Setauket, NY (US)

(73) Assignee: Symantec Corporation, Mountain View, CA (US)

( * ) Notice: Subject to any disclaimer, the term of this patent is extended or adjusted under 35 U.S.C. 154(b) by 539 days.

(21) Appl. No.: 12/495,321

(22) Filed: Jun. 30, 2009

(51) Int. Cl.
*G06F 9/00* (2006.01)
*G06F 15/177* (2006.01)

(52) U.S. Cl. .......................................... 713/2
(58) Field of Classification Search ............... 713/2
See application file for complete search history.

(56) References Cited

U.S. PATENT DOCUMENTS

| | | | |
|---|---|---|---|
| 6,044,461 A * | 3/2000 | Agha et al. .................. | 713/1 |
| 6,343,360 B1 * | 1/2002 | Feinleib ...................... | 713/1 |
| 7,174,446 B2 * | 2/2007 | Dennis et al. ................ | 713/1 |
| 7,395,422 B2 * | 7/2008 | Norton ......................... | 713/2 |
| 7,500,091 B2 * | 3/2009 | Ergan et al. ................. | 713/1 |
| 7,877,809 B1 * | 1/2011 | Sutton et al. ................ | 726/24 |
| 2006/0161987 A1 * | 7/2006 | Levy-Yurista ............... | 726/24 |
| 2008/0028024 A1 * | 1/2008 | Brittenham et al. ......... | 709/203 |
| 2008/0034349 A1 * | 2/2008 | Biswas et al. ............... | 717/121 |
| 2008/0162915 A1 * | 7/2008 | Price et al. .................. | 713/2 |
| 2009/0182732 A1 * | 7/2009 | Dian ............................ | 707/5 |

* cited by examiner

*Primary Examiner* — Mohammed Rehman
(74) *Attorney, Agent, or Firm* — Wilmer Cutler Pickering Hale and Dorr LLP

(57) ABSTRACT

A method and apparatus for optimizing a startup sequence to improve system boot time is described. In one embodiment, a method for configuring a startup sequence stored in memory, using one or more processors, to improve system boot time including accessing necessity indicia associated with a plurality of startup programs, wherein the necessity indicia comprising at least one of global reputation data or local interaction information, identifying at least one startup program to disable or postpone based on the necessity indicia and modifying at least one startup sequence to disable or delay execution of the at least one identified startup program.

20 Claims, 5 Drawing Sheets

METHOD AND APPARATUS FOR AUTOMATICALLY OPTIMIZING A STARTUP SEQUENCE TO IMPROVE SYSTEM BOOT TIME

BACKGROUND OF THE INVENTION

1. Field of the Invention

Embodiments of the present invention generally relate to computer process management systems and, more importantly, to a method and apparatus for automatically optimizing a startup sequence to improve system boot time.

2. Description of the Related Art

In a typical computing environment, an organization may employ a number of technologies to process, store and secure mission critical data. The organization may configure a plurality of computers with various software programs and hardware devices in order to operate effectively. For instance, a computer may utilize an operating system and one or more related components to produce a platform through which several software programs (e.g., word processing software, email software, spreadsheet software and/or the like) cooperate with certain hardware devices, such as hard disk space, memory, network components, storage components and/or the like.

When a computer is powered on, one or more processors execute various programs (e.g., bootloaders) that load data and software code into memory (e.g., Random Access Memory (RAM)). These programs permit access to various hardware devices and software programs. For example, a CPU may execute a system BIOS (Basic Input Output System) in order to initiate a boot sequence from a boot partition (e.g., a disk partition) and run the operating system. After the operating system loads various devices drivers and library files, the operating system generates a graphical user interface on a display. Then, the operating system initiates a sequence of startup programs of which a computer user may operate during a computing session.

A system registry (e.g., MICROSOFT WINDOWS registry) may include information associated with such a startup sequence. As such, the startup sequence may be modified in order to add and/or remove one or more startup programs. The startup sequence may also be modified in order to change an order in which the startup programs are executed during system boot time. Unfortunately, current startup management software are unable to determine an optimal sequence for these startup programs.

Therefore, there is a need in the art for a method and apparatus for automatically optimizing a startup sequence to improve system boot time.

SUMMARY OF THE INVENTION

Embodiments of the present invention generally include a method and apparatus for automatically optimizing a startup sequence to improve system boot time. In some embodiments, a method for configuring a startup sequence stored in memory using one or more processors to improve system boot time includes accessing necessity indicia associated with a plurality of startup programs, wherein the necessity indicia comprising at least one of global reputation data or local interaction information, identifying at least one startup program to postpone based on the necessity indicia and modifying at least one startup sequence to delay execution of the at least one identified startup program.

In some embodiments, at least one startup program to disable may be identified based on the necessity indicia. In some embodiments, the plurality of startup programs may be classified into at least one unnecessary startup program and at least one necessary startup program based on the global reputation data. In some embodiments, at least one unnecessary program may be disabled from the at least one startup sequence. In some embodiments, computer activity initiated by at least one startup program at a computer of the plurality of the startup programs may be monitored. In some embodiments, the at least one identified startup program may be removed from the at least one startup sequence. In some embodiments, the local interaction information may be examined to identify the at least one startup program to postpone. In some embodiments, the necessity indicia and the plurality of startup programs may be transformed into the at least one modified startup sequence.

In some embodiments, an apparatus for configuring a startup sequence stored in memory using one or more processors to improve system boot time includes means for processing necessity indicia associated with a plurality of startup programs, wherein the necessity indicia comprising at least one of global reputation data or local interaction information, means for identifying at least one startup program to postpone based on the necessity indicia and means for removing the at least one identified startup program from at least one startup sequence.

In some embodiments, the apparatus may further include means for delaying execution of the at least one identified startup program. In some embodiments, the apparatus may further include means for disabling the at least one startup program. In some embodiments, the apparatus may further include means for monitoring computer activity initiated by at least one startup program at a computer of the plurality of the startup programs. In some embodiments, the apparatus may further include means for classifying the plurality of startup programs into at least one unnecessary startup program and at least one necessary startup program based on the global reputation data. In some embodiments, the apparatus may further include means for selecting the at least one startup program to postpone based on the local interaction information. In some embodiments, the apparatus may further include means for transforming the necessity indicia and the plurality of startup programs into the at least one modified startup sequence.

In some embodiments, a computer-readable-storage medium comprising one or more processor-executable instructions that, when executed by at least one processor, causes the at least one processor to examine necessity indicia associated with a plurality of startup programs, wherein the necessity indicia comprising at least one of global reputation data or local interaction information, select at least one startup program to postpone based on the necessity indicia and delay execution of the at least one selected startup program during at least one startup sequence. In some embodiments, the one or more processor-executable instructions may identify the at least one startup program to postpone based on the local interaction information. In some embodiments, the one or more processor-executable instructions may classify the plurality of startup programs into at least one unnecessary startup program and at least one necessary startup program based on the global reputation data. In some embodiments, the one or more processor-executable instructions may rank the plurality of startup programs based on user interactions. In some embodiments, the one or more processor-executable instructions may transform the necessity indicia and the plurality of startup programs into the at least one modified startup sequence

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure achieve system boot time reduction by optimizing a sequence of startup programs. In some embodiments, an identification module (e.g., an identification module 118 of FIG. 1) may identify one or more startup programs to postpone of a plurality of startup programs (e.g., plurality of startup programs 110 of FIG. 1) based on necessity indicia, such as global reputation data (e.g., global reputation data 116) and/or local interaction information (e.g., local interaction information 414). In some embodiments, the identification module processes the necessity indicia and selects one or more startup programs to disable and/or delay execution at system boot time. The one or more startup programs may be deemed unnecessary by a community of computer users.

In some embodiments, the one or more startup programs may also be interacted with infrequently. In some embodiments, the identification module examines input/output activity between one or more users and the plurality of startup programs. For example, the identification module examines peripheral device inputs and/or computer display outputs to determine a degree of user interaction for each startup program of the plurality of startup programs. Then, the identification module ranks the plurality of startup programs based on such user interactions. The identification module selects each and every startup program having a rank that falls below a pre-defined threshold to postpone at system boot time.

Figure 1:
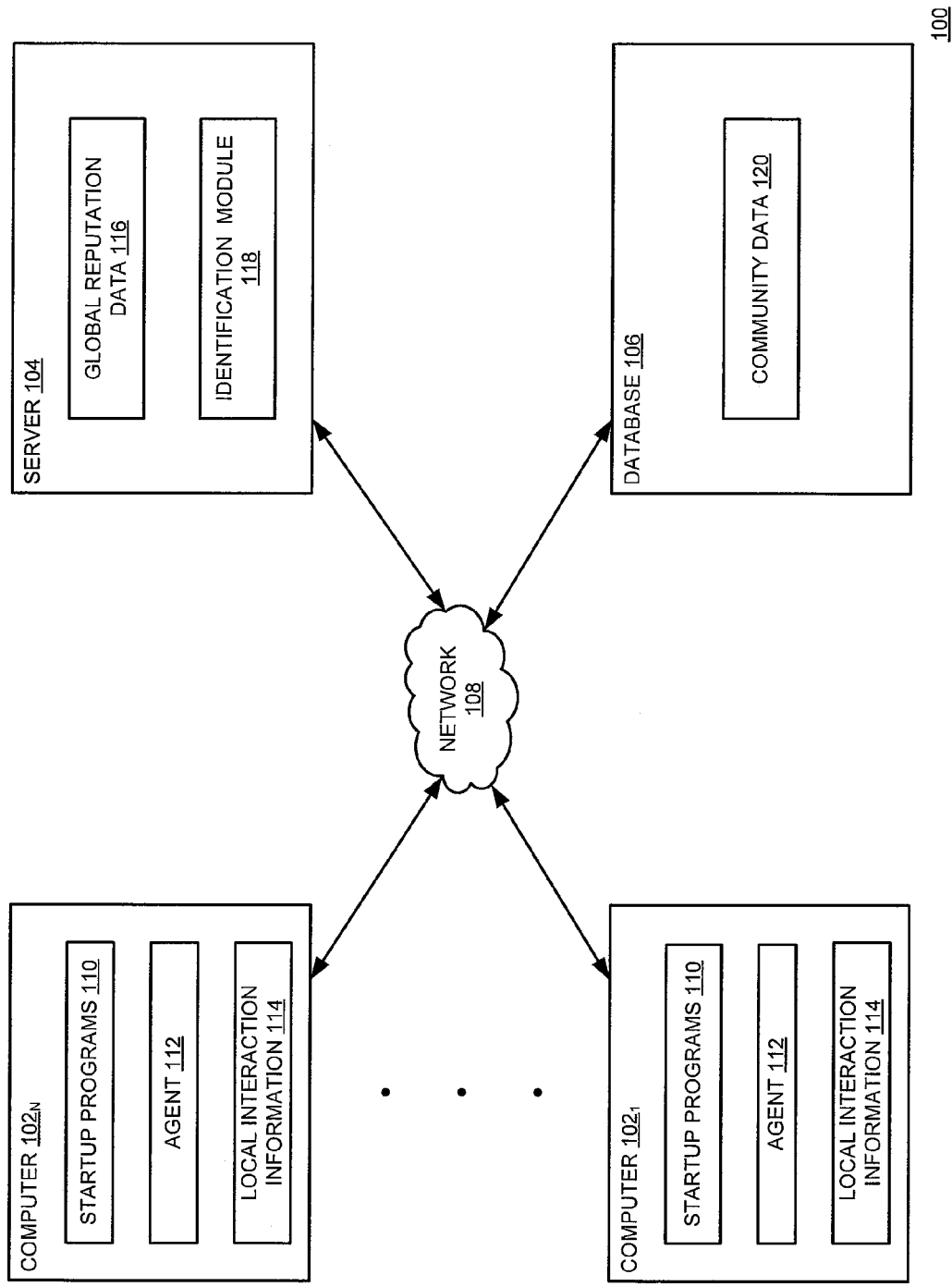
FIG. 1 is a block diagram of a system for automatically optimizing a startup sequence to improve system boot time according to one or more embodiments.

FIG. 1 is a system 100 for automatically optimizing a startup sequence to improve system boot time according to one or more embodiments. The system 100 includes a plurality of computers 102, a server 104 and a database 106 where each component is coupled to each other through a network 108.

Each of the plurality of computers 102 may be a type of computing device (e.g., a laptop, a desktop, a Personal Digital Assistant (PDA) and/or the like) known to one of ordinary skill in the art having the benefit of this disclosure. Furthermore, the each of the plurality of computers 102 includes one or more startup programs 110, an agent 112 and local interaction information 114. The startup programs 110 may refer to various software programs that are executed at computer system startup time. As the computer 102 boots an operating system, for example, several operating system processes load the various software programs into memory, such as email client programs, anti-virus/anti-spyware programs, backup/recovery systems, instant message software programs and/or the like.

The server 104 may be a type of computing device (e.g., a laptop, a desktop, a Personal Digital Assistant (PDA) and/or the like) known to one of ordinary skill in the art having the benefit of this disclosure. Generally, the server 104 provides the plurality of computers 102 with various database services and/or applications. The server 104 manages and performs various database commands (e.g., queries) on the database 106 on behalf of the plurality of computers 102. In some embodiments, the server 104 includes various data such as, classification information 116 as well as various software programs such as, an identification module 118.

The database 106 includes various hardware and/or software components for maintaining and controlling access to a plurality of records. In some embodiments, the database 106 may be cloud computing resource that is populated with community data 120, which may include information related to a plurality of programs and collected from the plurality of computers 102 over a period of time. The database 106 may include management software for organizing the plurality of records as tables in accordance with a particular model (e.g., relational model, hierarchal model and/or the like). In some embodiments, various software modules within the server 104 cooperate to aggregate such information in order to generate community data 120.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. Furthermore, the network 108 may form a portion of a Storage Network Area (SAN) using various communications infrastructure such as Ethernet, Fibre Channel, InfiniBand, Internet Small Computer System Interface (iSCSI) and/or the like.

In some embodiments, the agent 112 includes software code (e.g., processor executable instructions) for cooperating with a backend computer network (e.g., cloud computing resources) in order to perform maintenance and an analysis on various local software programs and/or hardware devices as explained in further detail below. In some embodiments, the agent 112 may include startup management software. In some embodiments, the agent 112 generates the local interaction information 114 by monitoring processes and memory associated with the execution of the startup programs 110 as explained further below.

Figure 2:
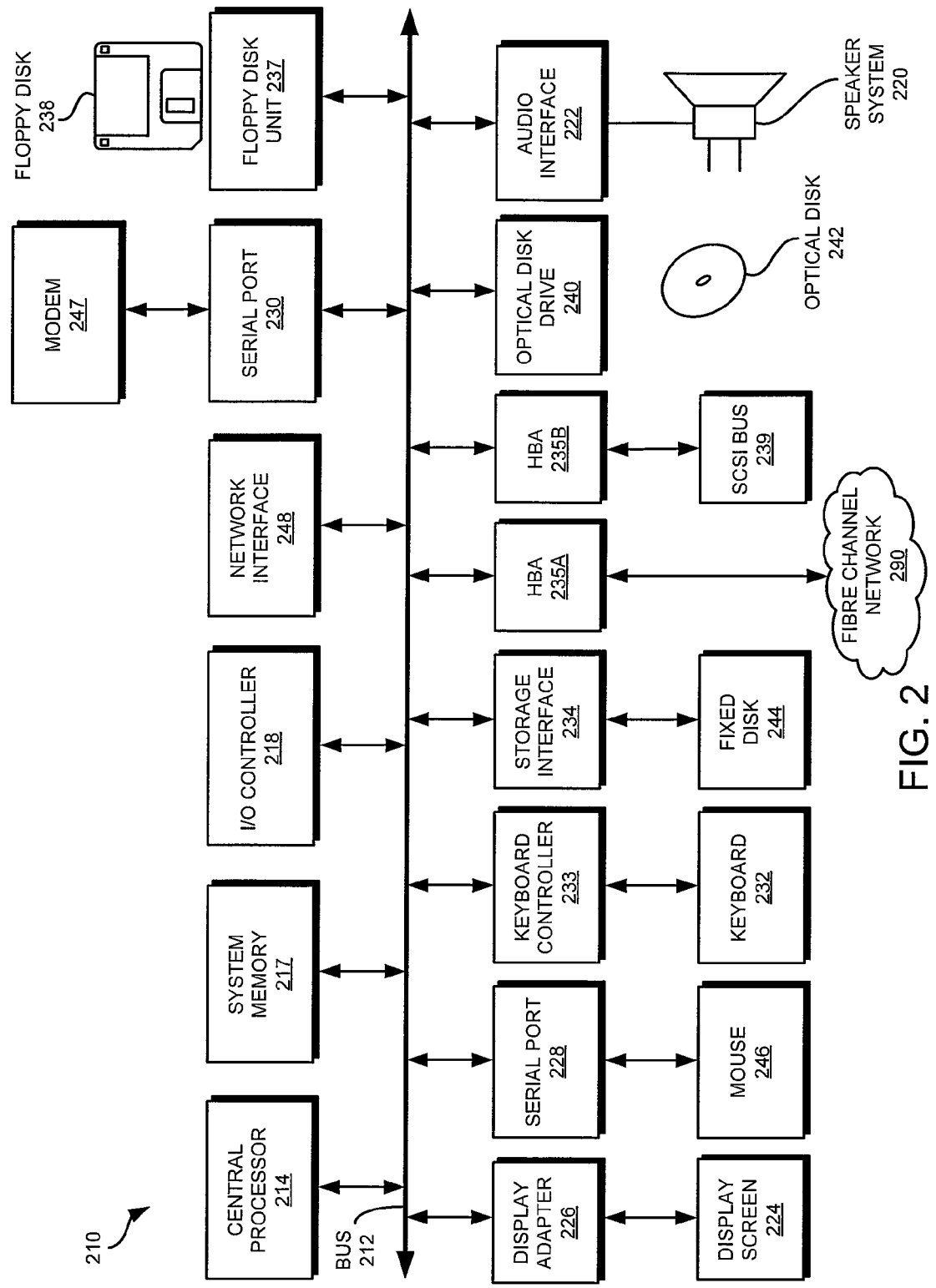
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement any computer of plurality of computers 102 and/or the server 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
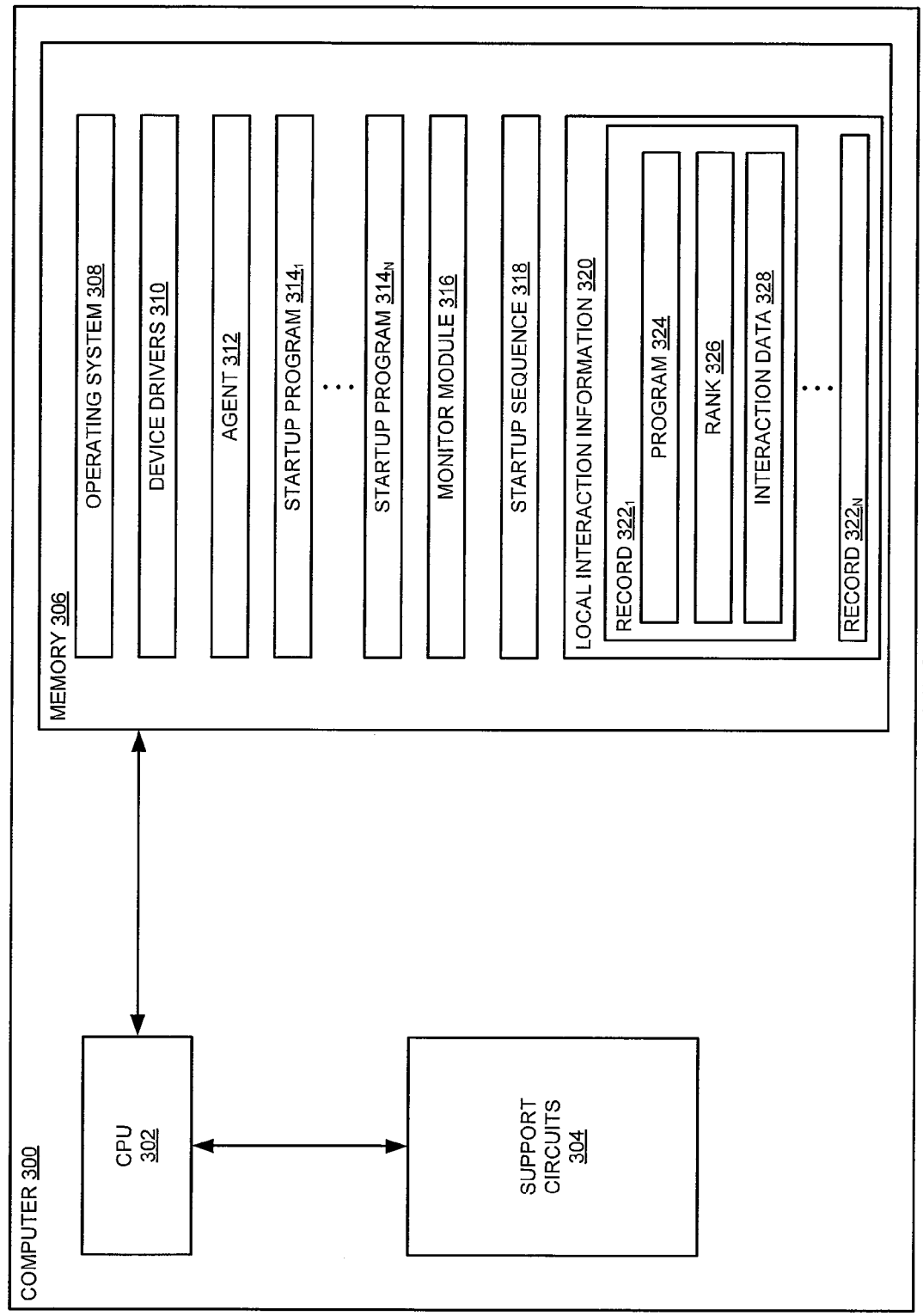
FIG. 3 is a block diagram of a client for automatically optimizing a startup sequence to improve system boot time according to one or more embodiments.

FIG. 3 is a block diagram of a computer 300 for automatically optimizing a startup sequence to improve system boot time according to one or more embodiments.

The computer 300 is a type of computing device (e.g., a laptop, a desktop, a Personal Digital Assistant (PDA), a tablet, a mobile phone and the like) that comprises a central processing unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308 and device drivers 310. The memory 306 includes various software modules, such as an agent 312, a plurality of startup programs 314, a monitor module 316. The memory 306 further includes various data, such as a startup sequence 318 and local interaction information 320.

The operating system 308 generally manages various computer resources (e.g., network resources, data storage resources, file system resources and/or the like). The operating system 308 is configured to execute operations on one or more hardware and/or software components, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

In some embodiments, the agent 312 includes software code (e.g., processor executable instructions) for monitoring various computing resources (e.g., hardware devices and/or software programs) and upholding optimal computer system stability and performance. In some embodiments, the agent 312 may cooperate with a cloud computing resource to perform maintenance on the client 300. For example, the agent 312 may cooperate with a backend server (e.g., the server 104 of FIG. 1 and/or the server 400 of FIG. 4) in order to optimize the startup sequence 318 and improve a boot time for the client 300.

In some embodiments, the monitor module 316 includes software code (e.g., processor executable instructions) for monitoring user interactions with the startup programs 314. In some embodiments, the monitor module 316 processes input/output activity between one or more users and the startup programs 314 and stores such activity in the local interaction information 320 as explained further below. The agent 312 examines the local interaction information 320 and selects one or more startup programs to postpone of the plurality of startup programs 314. For example, execution of the one or more startup programs may be postponed until completion of the startup sequence. In some embodiments, the agent 312 may modify the startup sequence 318 to delay execution of the one or more startup programs.

In some embodiments, the startup sequence 318 includes information associated with a system boot (i.e., startup) process. For instance, the startup sequence 318 may form a portion of a system registry (e.g., MICROSOFT Windows Registry). In some embodiments, the agent 312 modifies various system registry entries in order to remove the one or more startup programs from the startup sequence 318. The one or more startup programs, as a result, are postponed and not executed during performance of the system boot process.

In some embodiments, the local interaction information 320 includes a plurality of records 322 that may be organized in accordance with a database model (e.g., a relational database model, a hierarchical database model and/or the like). Each of the plurality of records 322 may include a program 324, a rank 326 and interaction data 328. The program 324 may be a unique identifier for a startup program (i.e., version information). In some embodiments, the rank 326 may refer to a particular degree of interaction between one or more users and the program 324 with respect to each and every other startup program at the client 300. In some embodiments, the interaction data 328 refers to input/output activity between one or more users of the client 300 and the program 324.

In some embodiments, the interaction data 328 may reflect user interactions with one or more computer resources (e.g., hardware devices, operating system processes, working memory and/or the like) associated with the program 324. In some embodiments, such user interactions may be direct. A user may directly interact with a particular startup program by communicating input through a device (e.g., a keyboard, mouse and/or the like). The user may also directly interact with the particular startup program by processing output through another device (e.g., a computer monitor). For example, the user may utilize a mouse to open a web browser window on a computer screen. As another example, the operating system may produce a message queue from the particular startup program. On the other hand, such user interactions may be indirect according to some embodiments. The user may indirectly interact with the particular startup program if the user directly interacts with another startup program, which directly interacts with the particular startup program.

In some embodiments, the monitor module 316 may be a driver (e.g., a file system driver) that monitors function calls (e.g., WIN32 Application Programming Interface (API) calls) associated with the plurality of startup programs 314. Such a driver may form a portion of an online computer management framework. The monitor module 316 records time information as well as quantity information associated with these user interactions for each and every startup program of the plurality of startup programs 314. The monitor module 316, for instance, determines an amount of input/output activity between a user and a particular startup program within a pre-defined time window during a system boot process (e.g., a number of minutes after a login/authentication process).

In some embodiments, the monitor module 316 processes a pre-defined number of system boot processes and determines a rank for each of the plurality of startup programs 314 based on user interactions. Such rank may represent a degree of input/output activity between a particular startup program and a user when compared to the user interactions in totality. If the user interacts with the particular startup program early and often, then the monitor module assigns a high rank to the particular startup program. If, on the other hand, the user interacts with the particular startup program infrequently or rarely, then the monitor module assigns a low rank. As explained further below, an identification module (e.g., the identification module 118 of FIG. 1 and/or an identification module 414 of FIG. 4) may examine these rankings and select one or more startup programs of the plurality to postpone during performance of the startup sequence 318. For example, the identification module may select the one or more startup programs having a rank that exceeds a pre-defined threshold.

Figure 4:
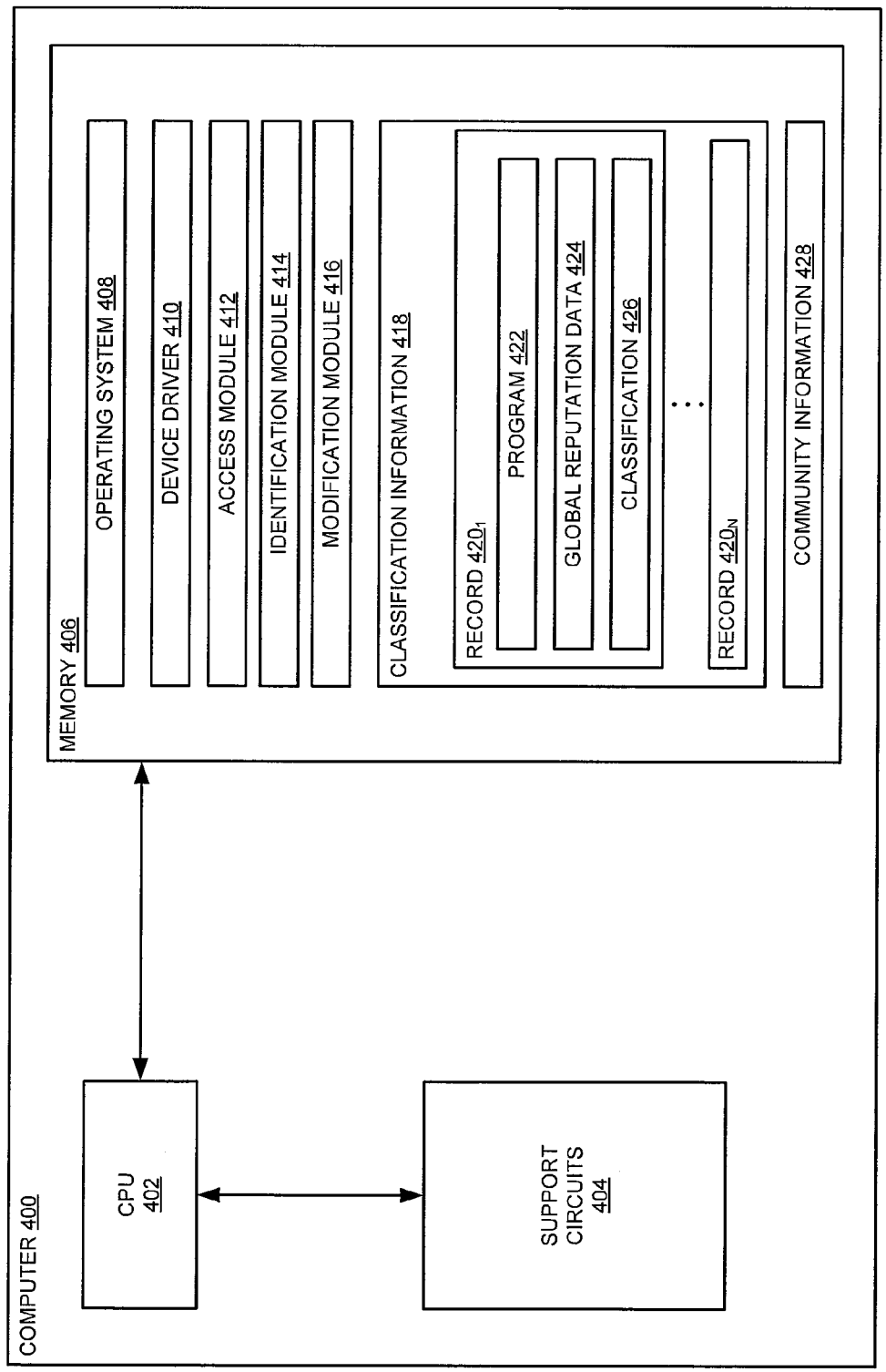
FIG. 4 is a block diagram of a server for automatically optimizing a startup sequence to improve system boot time according to one or more embodiments.

FIG. 4 is a block diagram of a server 400 for automatically optimizing a startup sequence to improve system boot time according to one or more embodiments.

The server 400 is a type of computing device (e.g., a laptop, a desktop, a Personal Digital Assistant (PDA), a tablet, a mobile phone and the like) that comprises a central processing unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a read only memory, random access memory, disk drive storage, optical storage, removable storage, and the like. The memory 406 includes an operating system 408 and device drivers 410. The memory 406 also includes various software modules, such as an access module 412, an identification module 414 and/or a modification module 416. The memory 406 further includes various data, such as classification information 418 and community data 428.

In some embodiments, the access module 412 includes software code (e.g., processor executable instructions) for processing the global reputation 424 and/or local interaction information (e.g., the local interaction information 114 of FIG. 1 and/or the local interaction information 320 of FIG. 3). In some embodiments, the access module 412 communicates commands to one or more database management systems to access data that is collected from a community of computer users. The access module 412 stores such data in the community data 428. Then, the access module 412 produces the global reputation information from the community data as explained further below.

In some embodiments, the classification information 418 includes a plurality of records 420 associated with a plurality of software programs currently in use at various ones of a plurality of computers (e.g., the plurality of computers 102 of FIG. 1). Each of the plurality of records 420 includes a program 422, a global reputation data 424 and a classification 426. The program 422 includes a unique identifier for a certain software program. In some embodiments, the global reputation data 424 includes one or more parameters based on a metric for evaluating prevalence and usage of various software programs at a plurality of computers (e.g., the plurality of computers 102). In some embodiments, the classification 426 may indicate a category to which the certain software program belongs based on the global reputation data 424.

For example, the global reputation data 424 may indicate that very few computers include copies of a particular startup program. Accordingly, the classification 426 may indicate that the particular startup program is unnecessary. On the other hand, the global reputation data 424 may reflect that a statistically significant number of computers include copies of the particular startup program. The classification 426 may indicate that the particular startup program is necessary and/or unnecessary.

In some embodiments, the various parameters for the global reputation data 424 may include a disable parameter and a machine prevalence parameter. For a particular startup program, the disable parameter may represent a ratio between a number of uninstalled or disabled copies and a number of installed copies according to some embodiments. Furthermore, the disable parameter may be a fraction or decimal value that results from dividing a number of computers that uninstalled or disabled the copies of the particular startup program and a number of computers that installed the particular startup program. In some embodiments, the machine prevalence parameter may include a ratio between a number of executed copies of the particular startup program and a total number of computers within a sample group (e.g., the plurality of computers 102 of FIG. 1). The global reputation data 424, therefore, may be a two-tuple that includes the disable parameters and the machine prevalence parameter.

In some embodiments, the access module 412 communicates with an agent (e.g., the agent 112) operating within a computer (e.g., the computer 102 of FIG. 1) in order to access the local interaction information. In some embodiments, the server 400 may be coupled with various cloud computing resources that store virtual copies of a plurality of computers. These virtual copies (e.g., virtual machine images, such as VMDK files) represent a hardware and software configuration and include the local interaction information for each computer of the plurality of computers. Various virtualization technologies may mount the virtual copies and generate virtual machines that operate in a same manner as physical machines. Accordingly, the access module 412 communicates with these physical machines in order to access the local interaction information.

In some embodiments, the identification module 414 includes software code (e.g., processor executable instructions) for examining the global reputation data and/or the local interaction information and identifying one or more startup programs to postpone at system boot time. The identification module 414 is stored in the memory 406 and executed using one or more processors. In some embodiments, the identification module 414 examines the local interaction information and ranks each of the plurality of startup programs (e.g., the plurality of startup programs 314 of FIG. 3) based on a degree of user interactions. The identification module 414 selects each and every startup program having a rank that exceeds a pre-defined threshold. These startup programs may be delayed until an end of one or more startup sequences. In some embodiments, these startup programs may be disabled as explained further below. The identification, similarly, may examine the global reputation data 424 and select each and every unnecessary startup program as explained below.

In some embodiments, the modification module 416 includes software code (e.g., processor executable instructions) that is stored in the memory 406 and configured to delay execution of one or more startup programs. The modification module 416 may be executed using the one or more processors in order to modify one or more startup sequences. In some embodiments, the modification module 416 cooperates with each agent at one or more computers to modify one or more system registry entries such that the one or more startup programs are executed later at system boot time or removed altogether from the one or more startup sequences.

In some embodiments, the identification module 414 may examine the global reputation data 424 and identify one or more startup programs to postpone at system boot time. In some embodiments, the identification module 414 may utilize various machine learning techniques (e.g., decision trees, thresholding and/or the like) to classify a plurality of startup programs as necessary or unnecessary based on the disable fraction parameter and the machine prevalence parameter. In some embodiments, the identification module 414 identifies one or more unnecessary startup programs and/or one or more necessary startup programs. For example, if the disable fraction parameter reflects a reluctance to disable and/or uninstall a particular startup program amongst a computer user community, then the identification module 414 determines that the particular startup program is most likely a necessary program. On the other hand, if the machine prevalence parameter indicates that only a few computers include the particular startup program installation out of a large global network of computers, then the identification module 414 determines that the particular startup program is most likely an unnecessary startup program.

In some embodiments, the identification module 414 may examine various portions of the local interaction information and the global reputation data 424 to reduce false positives and false negatives while indentifying one or more startup programs to postpone. For example, within the computer user community, a particular anti-virus program may be installed on a few computers but may be very vital to computer security. Users on these computers often interact with the particular anti-virus program (e.g., configuring and running security scans). Even though the particular anti-virus program is scarce amongst the computer user community, the particular anti-virus is very necessary to maintaining system stability and performance. The identification module 414 stores data in the classification 426 indicating that the particular anti-virus program is a necessary startup program.

In some embodiments, the identification module 414 may instruct the modification module 416 to disable one or more startup programs if a certain confidence level is achieved for the global reputation data 424. If the certain confidence level is For example, the identification module 414 may perform a statistical analysis (e.g., adjusted Wald method) on the global reputation data 424 to determine a confidence level for the disable fraction parameter and/or the machine prevalence parameter for each of a plurality of startup programs. If the determined confidence level meets or exceeds a predefined threshold, then values for the global reputation data 414 are statistically significant.

In some embodiments, the community data 428 includes information regarding the plurality of startup programs and collected from the plurality of computers. In some embodiments, the community data 428 indicates a number of installations of a certain startup program as well as a number of computers that disabled and/or un-installated the certain startup program. In some embodiments, the community data 428 indicates a number of computers that executed the certain startup program. In some embodiments, a computer may include an installation of the certain startup program but may never execute and operate the certain startup program.

Figure 5:
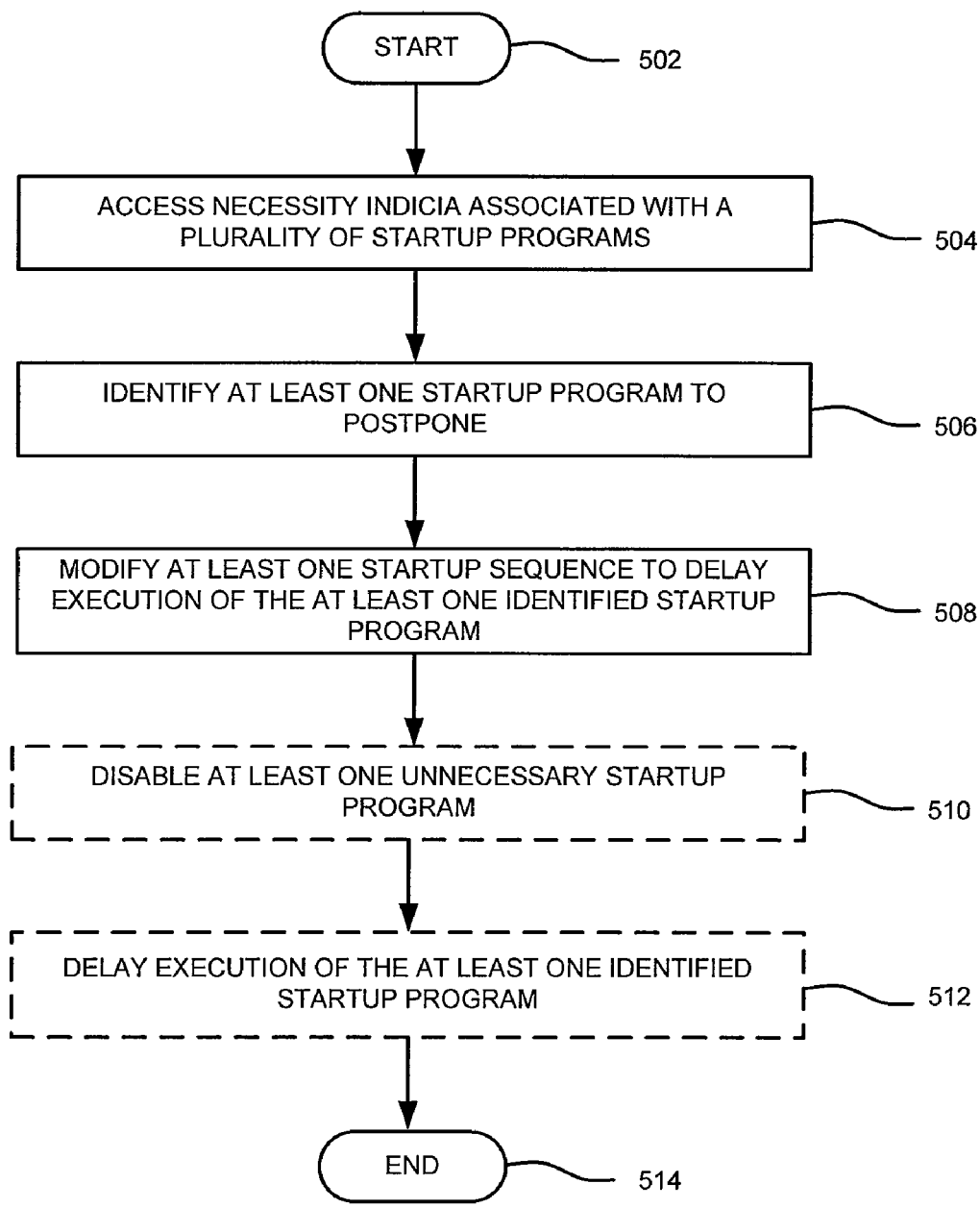
FIG. 5 is a flow diagram of a method for automatically optimizing a startup sequence to improve system boot time according to one or more embodiments.

FIG. 5 is a flow diagram of a method 500 for automatically optimizing a startup sequence to improve system boot time according to one or more embodiments. The method 500 starts at step 502 and proceeds to step 504.

At step 504, necessity indicia associated with a plurality of startup programs is accessed. In some embodiments, the necessity indicia includes global reputation data (e.g., the global reputation data 116 of FIG. 1 and/or the global reputation data 424 of FIG. 4) and/or local interaction information (e.g., the local interaction information 114 of FIG. 1 and/or the local interaction information 320 of FIG. 3). In some embodiments, various software modules, using one or more processors (e.g., the CPU 402), cooperate to transform the necessity indicia and a plurality of startup programs into one or more modified startup sequences that reduce system boot time. In some embodiments, an access module (e.g., the access module 412 of FIG. 4) examines the global reputation data and/or the local interaction data stored in memory (e.g., the memory 406 of FIG. 4) using the one or more processors.

At step 506, at least one startup program to postpone based on the necessity indicia is identified. In some embodiments, an identification module (e.g., the identification module 118 of FIG. 1 and/or the identification module 414 of FIG. 4) processes the global reputation data and/or the local interaction information and identifies one or more startup programs to postpone during performance of one or more startup sequences (e.g., the startup sequence 318 of FIG. 3) at one or more computers (e.g., the client 300) of a plurality of computers (e.g., the plurality of computers 102 of FIG. 1).

In some embodiments, the identification module examines the local interaction information to access a rank (e.g., the rank 326 of FIG. 3) associated with each of the plurality of startup programs. Such rankings may represent a degree or amount of user interaction with the each of the plurality of startup programs. If a particular startup program having a certain rank that falls below a pre-defined threshold, the identification module selects the particular startup program to delay and/or disable execution during the one or more startup sequences.

In some embodiments, the identification module examines the global reputation data to access a classification (e.g., the classification 426 of FIG. 4) associated with the each of the plurality of startup programs. Such classifications may represent a reputation amongst a computer user community of a necessity of the plurality of startup programs. If a certain classification indicates that the particular startup program is unnecessary and may be postponed without negatively effecting user experience, the identification module selects the particular startup program. The identification module cooperates with various software modules to delay and/or disable execution of the particular startup program during the one or more startup sequences as explained further below.

At step 508, the at least one startup sequence is modified to delay execution of the at least one identified startup program. After the identification module selects one or more startup programs to postpone, the identification module instructs a modification module (e.g., the modification module 416 of FIG. 4) to delay and/or disable the one or more startup programs according to some embodiments. In some embodiments, a modification module accesses a system registry and modifies various entries in order to remove one or more startup programs from one or more startup sequences.

At step 510, one or more unnecessary startup programs may be disabled. Based on the global reputation data, the identification module may classify the at least one identified startup programs into unnecessary and/or necessary startup programs. Accordingly, the modification module modifies various system registry entries to disable the one or more unnecessary startup programs. When the one or more startup sequences are performed, the one or more unnecessary startup programs are not executed.

At step 512, execution of the at least one identified startup program may be delayed. In some embodiments, the identification module may instruct the modification module to delay execution of the one or more startup programs. The modification module proceeds to modify one or more registry entries such that an operating system process executes the one or more startup programs at a later position during the performance of the one or more startup sequences. At step 514, the method 500 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for configuring a startup sequence stored in memory, using one or more processors, to improve system boot time, comprising:
    accessing necessity indicia associated with a plurality of startup programs, wherein the necessity indicia comprising at least one of local interaction information or global reputation data;
    identifying at least one of the plurality of startup programs to postpone based on the necessity indicia, wherein identifying the at least one of the plurality of startup programs to postpone further comprises:
        ranking the plurality of startup programs, wherein a rank is assigned to each of the plurality of startup programs based on a degree or amount of user interaction, and
        classifying the plurality of startup programs into at least one unnecessary startup program and at least one necessary startup program based on the ranking of the plurality of startup programs; and
    modifying at least one startup sequence to delay execution of the at least one identified startup program in the event the at least one identified startup program comprises a rank falls below a pre-defined threshold.

2. The method of claim 1, wherein identifying the at least one of the plurality of startup programs to postpone further comprises identifying at least one startup program to disable based on the necessity indicia.

3. The method of claim 1, wherein identifying the at least one of the plurality of startup programs to postpone further comprises classifying the plurality of startup programs into at least one unnecessary startup program and at least one necessary startup program based on the global reputation data.

4. The method of claim 1 further comprising disabling at least one unnecessary program from the at least one startup sequence.

5. The method of claim 1 wherein accessing the necessity indicia further comprising monitoring user interactions with at least one startup program at a computer of the plurality of computers.

6. The method of claim 1 further comprising removing the at least one identified startup program from the at least one startup sequence.

7. The method of claim 1 further comprising examining the local interaction information to identify the at least one startup program to postpone.

8. The method of claim 1 further comprising transforming the necessity indicia and the plurality of startup programs into at least one modified startup sequence.

9. The method of claim 1, wherein accessing the necessity indicia further computing the global reputation data from a machine prevalence parameter and a disable parameter.

10. An apparatus for configuring a startup sequence stored in memory, using one or more processors, to improve system boot time, comprising:
 means for processing necessity indicia associated with a plurality of startup programs, wherein the necessity indicia comprising at least one of global reputation data or local interaction information;
 means for identifying at least one of the plurality of startup programs to postpone based on the necessity indicia, wherein identifying the at least one of the plurality of startup programs to postpone comprises:
  ranking the plurality of startup programs, wherein a rank is assigned to each of the plurality of startup programs based on a degree or amount of user interaction, and
  classifying the plurality of startup programs into at least one unnecessary startup program and at least one necessary startup program based on the ranking of the plurality of startup programs; and
 means for removing the at least one identified startup program from at least one startup sequence in the event the at least one identified startup program comprises a rank that falls below a pre-defined threshold.

11. The apparatus of claim 10 further comprising means for delaying execution of the at least one identified startup program.

12. The apparatus of claim 10 further comprising means for monitoring computer activity initiated by at least one startup program at a computer of the plurality of the startup programs.

13. The apparatus of claim 10 further comprising means for classifying the plurality of startup programs into at least one unnecessary startup program and at least one necessary startup program based on the global reputation data.

14. The apparatus of claim 10 further comprising means for selecting the at least one startup program to postpone based on the local interaction information.

15. The apparatus of claim 10 further comprising means for transforming the necessity indicia and the plurality of startup programs into at least one modified startup sequence.

16. A non-transitory computer-readable-storage medium comprising one or more processor-executable instructions that, when executed by at least one processor, causes the at least one processor to:
 examine necessity indicia associated with a plurality of startup programs, wherein the necessity indicia comprising at least one of global reputation data or local interaction information;
 select at least one of the plurality of startup programs to postpone based on the necessity indicia, wherein selecting the at least one of the plurality of startup programs to postpone comprises:
  ranking the plurality of startup programs, wherein a rank is assigned to each of the plurality of startup programs based on a degree or amount of user interaction, and
  classifying the plurality of startup programs into at least one unnecessary startup program and at least one necessary startup program based on the ranking of the plurality of startup programs; and
 delay execution of the at least one selected startup program during at least one startup sequence in the event the at least one identified startup program comprises a rank that falls below a pre-defined threshold.

17. The computer-readable-storage medium of claim 16 wherein ranking the plurality of startup programs is based on a degree or amount of user interactions.

18. The computer-readable-storage medium of claim 16 further comprising one or more processor-executable instructions that, when executed by the at least one processor, causes the at least one processor to:
 disable the at least one startup program.

19. The computer-readable-storage medium of claim 16 further comprising one or more processor-executable instructions that, when executed by the at least one processor, causes the at least one processor to:
 transform the necessity indicia and the plurality of startup programs into at least one startup sequence.

20. The computer-readable-storage medium of claim 16 further comprising one or more processor-executable instructions that, when executed by the at least one processor, causes the at least one processor to:
 classify the plurality of startup programs into at least one unnecessary startup program and at least one necessary startup program based on the global reputation data.

* * * * *